(12) United States Patent
Yu (10) Patent No.: US 12,321,078 B2
(45) Date of Patent: Jun. 3, 2025

(54) ARRAY ANTENNA CAPABLE OF SHIFTING PHASE OF LIGHT

(71) Applicant: GIST(Gwangju Institute of Science and Technology), Gwangju (KR)

(72) Inventor: Nan Ei Yu, Gwangju (KR)

(73) Assignee: GIST(Gwangju Institute of Science and Technology), Gwangju (KR)

( * ) Notice: Subject to any disclaimer, the term of this patent is extended or adjusted under 35 U.S.C. 154(b) by 557 days.

(21) Appl. No.: 17/702,288

(22) Filed: Mar. 23, 2022

(65) Prior Publication Data

US 2022/0214596 A1 Jul. 7, 2022

Related U.S. Application Data

(63) Continuation of application No. PCT/KR2020/015752, filed on Nov. 11, 2020.

(30) Foreign Application Priority Data

Nov. 11, 2019 (KR) ........................ 10-2019-0143858

(51) Int. Cl.
G02F 1/295 (2006.01)
(52) U.S. Cl.
CPC ...... G02F 1/2955 (2013.01); *G02F 2201/305* (2013.01)
(58) Field of Classification Search
None
See application file for complete search history.

(56) References Cited

U.S. PATENT DOCUMENTS

| | | | |
|---|---|---|---|
| 2006/0091305 A1* | 5/2006 | Grunnet-Jepsen | ........................... G01D 5/35316 |
| | | | 250/363.06 |
| 2019/0004393 A1* | 1/2019 | Hashiya | .................. G01S 17/89 |
| 2019/0094651 A1* | 3/2019 | Timurdogan | ........... G02F 1/335 |

(Continued)

FOREIGN PATENT DOCUMENTS

| KR | 10-2009-0120254 A | 11/2009 |
|---|---|---|
| KR | 10-2015-0104137 A | 9/2015 |
| KR | 10-1720434 B1 | 3/2017 |

(Continued)

OTHER PUBLICATIONS

International Search Report issued in PCT/KR2020/015752; mailed Feb. 15, 2021.

*Primary Examiner* — Mustak Choudhury
(74) *Attorney, Agent, or Firm* — Studebaker Brackett PLLC (57) ABSTRACT

Disclosed is an array antenna which is capable of shifting a phase of light. According to one aspect of the present exemplary embodiment, an optical phase shifting array antenna includes: a receiving unit configured to distribute input light to a plurality of antenna element waveguides; a phase shifting unit configured to shift a phase of light propagated to each antenna element waveguide by applying heat to each antenna element waveguide; an output unit including a plurality of antenna elements, and configured to output the light, which is propagated to each antenna element waveguide after a phase is varied in the phase shifting unit, to each antenna element; and a base part configured to seat the receiving unit, the phase shifting unit, and the output unit.

5 Claims, 6 Drawing Sheets

(56) References Cited

U.S. PATENT DOCUMENTS

2019/0227351 A1* 7/2019 Behroozpour ........ G01S 7/4817
2019/0391243 A1* 12/2019 Nicolaescu ............. G01S 17/42

FOREIGN PATENT DOCUMENTS

KR     10-1892357 B1    8/2018
KR     10-1924890 B1    12/2018

* cited by examiner

ARRAY ANTENNA CAPABLE OF SHIFTING PHASE OF LIGHT

CROSS-REFERENCE TO RELATED APPLICATIONS

This application is a Continuation of International Application No. PCT/KR2020/015752 filed on Nov. 11, 2020, which claims priority to and the benefit of Korean Patent Application No. 10-2019-0143858 filed in the Korean Intellectual Property Office on Nov. 11, 2019, the entire contents of which are incorporated herein by reference.

TECHNICAL FIELD

The exemplary embodiment relates to an array antenna capable of precisely shifting a phase of light.

BACKGROUND ART

The content described in this section merely provides background information for the present exemplary embodiment and does not constitute the prior art.

A LIDAR sensor for autonomous driving vehicles acquires three-dimensional special information by measuring the time taken for an incident pulse layer to be reflected from an object and return. According to a laser radiation method, the LIDAR is generally divided into a flash and a scanning method. The flash-type LIDAR is a method of simultaneously scanning a laser beam over a large area, and includes a 2D array-type light receiving element so that a receiving unit is capable of recognizing a reflected image. On the contrary, the scanning-type LIDAR includes performs point mapping on a three-dimensional space through vertical and horizontal rotation of a laser beam. Therefore, the scanning type LIDAR has less laser light source output and a simple receiving unit structure compared to the flash type LIDAR.

The scanning type LIDAR in the related art measures a 360° viewing angle by a mechanical motor rotation. However, the basic mechanical LIDAR cannot be used in unmanned aerial vehicles that require limited power and weight because the motor for rotation is heavy and the LIDAR consumes a lot of power, and there is a problem in that the mechanical rotation speed does not correspond to the rotation speed required for highway driving of autonomous vehicles.

Therefore, the scanning type LIDAR in the related dart considered the use of an optical phased array antenna. The optical phased array antenna uses several directional couplers to disperse the incident laser to each antenna element, and modulates the phase of the dispersed laser to output the laser in a desired direction.

However, a waveguide in the scanning method in the related art increases the size of the evanescent wave of the waveguide mode due to the low refractive index, so the waveguide may easily interact with an adjacent waveguide having the same propagation constant. In order to widen the limited horizontal viewing angle of the optical phased array antenna, a gap between the antenna elements needs to be close to a distance equal to half the wavelength ($\lambda/2$), and as the antenna elements get closer, the desired output phase distribution cannot be obtained due to cross-talk between adjacent elements. In the case of LIDAR intended to be installed in an autonomous vehicle, since normal operation is important for the safety of occupants and pedestrians, the LIDAR in the related art has a problem in that it is difficult to install the LIDAR in devices, such as autonomous vehicles.

SUMMARY OF THE INVENTION

An exemplary of the present invention has an object to provide an optical phase shifting array antenna which is lighter and cheaper by replacing mechanical rotation and is capable of accurately outputting light as desired.

An aspect of the present exemplary embodiment provides an optical phase shifting array antenna including: a receiving unit configured to distribute input light to a plurality of antenna element waveguides; a phase shifting unit configured to shift a phase of light propagated to each antenna element waveguide by applying heat to each antenna element waveguide; an output unit including a plurality of antenna elements, and configured to output the light, which is propagated to each antenna element waveguide after a phase is varied in the phase shifting unit, to each antenna element; and a base part configured to seat the receiving unit, the phase shifting unit, and the output unit.

According to the aspect of the present exemplary embodiment, the receiving unit includes a multi-mode interference coupler, a Y-junction coupler, or a directional coupler in order to distribute the input light to the plurality of antenna element waveguides.

According to the aspect of the present exemplary embodiment, in the phase shifting unit, the amounts of heat heating the respective antenna elements waveguide is different from each other.

According to the aspect of the present exemplary embodiment, the base part is formed by stacking a silicon substrate and a silicon oxide cladding on the silicon substrate.

According to the aspect of the present exemplary embodiment, each of the plurality of antenna elements includes diffraction gratings having a predetermined interval.

According to the aspect of the present exemplary embodiment, the diffraction grating is aperiodically formed.

According to the aspect of the present exemplary embodiment, in the diffraction gratings, the interval between the diffraction gratings decreases from an outer edge of the antenna element toward a center, and the interval between the diffraction gratings is maintained constantly within a preset range from the center of the antenna element, and the interval between the diffraction gratings increases again from the center of the antenna element toward the outer edge out of the preset range.

According to the aspect of the present exemplary embodiment, in the diffraction gratings, the interval between the diffraction gratings decreases from an outer edge of the antenna element toward a center, and the interval between the diffraction gratings increases again from the center of the antenna element.

According to the aspect of the present exemplary embodiment, the output unit outputs the light propagated to the antenna element waveguide in a direction vertical to a propagation direction of light.

As described above, according to the aspect of the present exemplary embodiment, the optical phase shifting array antenna of the present invention is lighter and cheaper by replacing mechanical rotation and is capable of accurately outputting light as desired, thereby being mounted as a LIDAR system in various devices.

DETAILED DESCRIPTION

The present invention may have various modifications and exemplary embodiments and thus specific exemplary embodiments will be illustrated in the drawings and described. However, it is not intended to limit the present invention to the specific exemplary embodiments, and it will be appreciated that the present invention includes all modifications, equivalences, or substitutions included in the spirit and the technical scope of the present invention. In describing each drawing, like reference numerals in the drawings refer to the same or similar functions.

Terms including an ordinary number, such as first, second, A, and B, are used for describing various constituent elements, but the constituent elements are not limited by the terms. The terms are used only to discriminate one constituent element from another constituent element. For example, without departing from the scope of the invention, a first constituent element may be named as a second constituent element, and similarly a second constituent element may be named as a first constituent element. A term "and/or" includes a combination of multiple relevant described items or any one of the multiple relevant described items.

It should be understood that when one constituent element referred to as being "coupled to" or "connected to" another constituent element, one constituent element can be directly coupled to or connected to the other constituent element, but intervening elements may also be present. In contrast, when one constituent element is "directly coupled to" or "directly connected to" another constituent element, it should be understood that there are no intervening element present.

Terms used in the present application are used only to describe specific exemplary embodiments, and are not intended to limit the present invention. Singular expressions used herein include plurals expressions unless they have definitely opposite meanings in the context. In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

All terms used herein including technical or scientific terms have the same meanings as meanings which are generally understood by those skilled in the art unless they are differently defined. Terms defined in generally used dictionary shall be construed that they have meanings matching those in the context of a related art, and shall not be construed in ideal or excessively formal meanings unless they are clearly defined in the present application.

Terms defined in generally used dictionary shall be construed that they have meanings matching those in the context of a related art, and shall not be construed in ideal or excessively formal meanings unless they are clearly defined in the present application.

In addition, each configuration, process, or method included in each exemplary embodiment of the present invention may be shared within a range that does not technically contradict each other.

Figure 1:
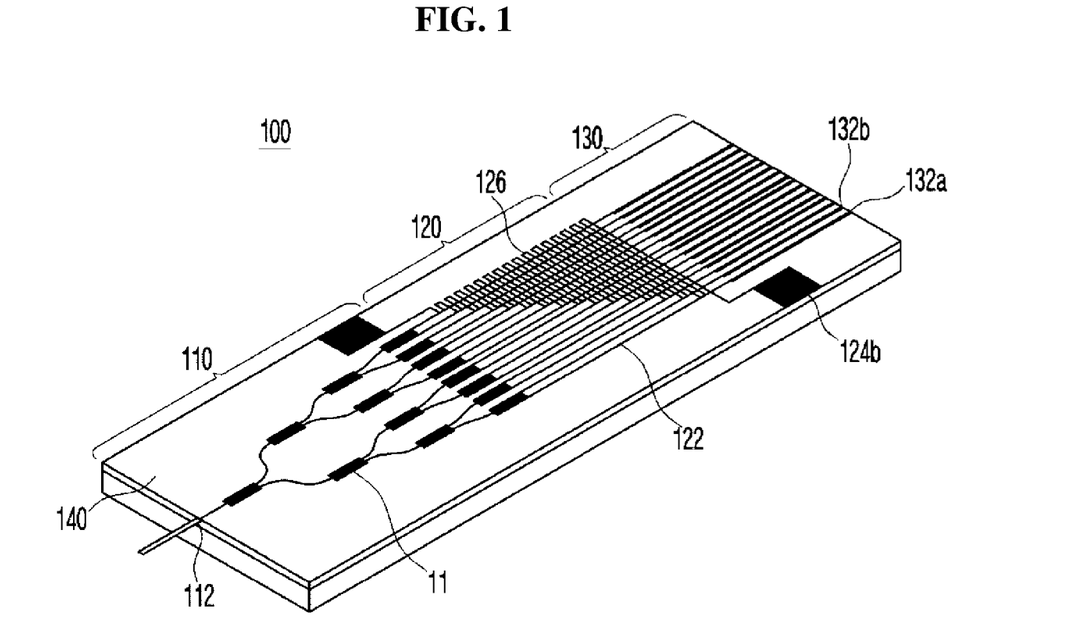
FIG. 1 is a diagram illustrating a configuration of an optical phase shifting array antenna according to an exemplary embodiment of the present invention.

FIG. 1 is a diagram illustrating a configuration of an optical phase shifting array antenna according to an exemplary embodiment of the present invention.

Referring to FIG. 1, an optical phase shifting array antenna 100 according to an exemplary embodiment of the present invention includes a receiving unit 110, a phase shifting unit 120, an output unit 130, and a base unit 140.

The optical phase shifting array antenna 100 is configured to adjust a direction of light output by shifting a phase of (laser) light to be irradiated for sensing within a LIDAR system (not illustrated). The optical phase shifting array antenna 100 may configure the LIDAR system together with a light source (not illustrated) which generates light and outputs (transmits) the generated light to the optical phase shifting array antenna and a sensing device (not illustrated) which receives reflected light that is reflected from a target and the like and senses the received light.

The receiving unit 110 receives light output from the light source (not illustrated), and distributes the received light to a plurality of antenna element waveguides by using a plurality of couplers.

The receiving unit 110 includes a first optical coupler for receiving the light output from the light source (not illustrated). A mode diameter of the light output from the light source (not illustrated) is usually different from a mode diameter of a waveguide 122, which is to be described below, within the optical phase shifting array antenna 100. The receiving unit 110 completely receives the light output from the light source by adjusting the mode diameter of the light output from the light source by using the first optical coupler 112. The first optical coupler 112 may have a reverse-tapered structure in the cantilever-shaped silicon oxide waveguide to adjust the mode diameter of light.

The receiving unit 110 distributes the received light to the plurality of antennal element waveguides by using a second optical coupler 114. Herein, the second optical coupler 114 may be implemented with a multi-mode interference coupler, a Y-junction coupler, or a directional coupler, and one or more second couplers are included to distribute the received light to the plurality of antennal element waveguides.

The phase shifting unit 120 changes a refractive index of each antenna element waveguide 122 and changes a phase of a waveguide mode.

The phase shifting unit 120 includes a micro heater 126 and an electrode 124 which is capable of supplying power to the micro heater 126. The phase shifting unit 120 changes a refractive index of each waveguide 122 by applying Joule's heat to the antenna element waveguide 122 by using the micro heater 126, and the change in the refractive index of the waveguide causes the phase change of the waveguide mode. The micro heater 126 and the electrode 124 are illustrated in detail in FIG. 2.

Figure 2:
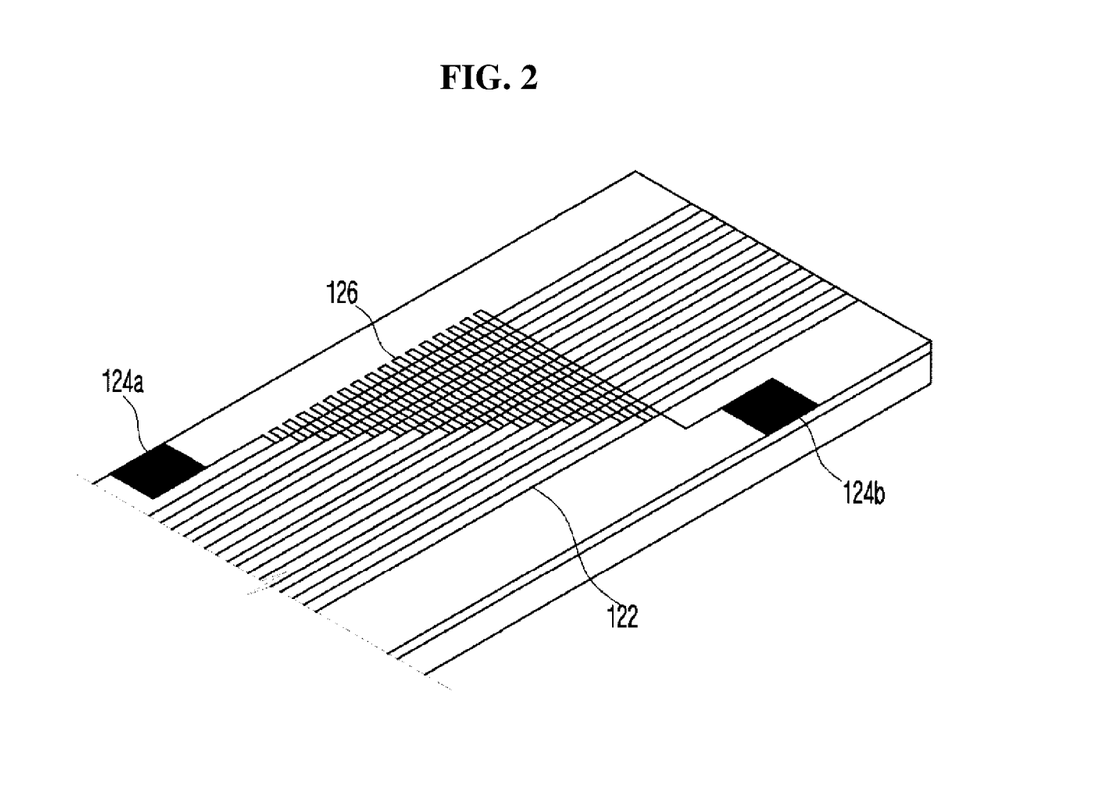
FIG. 2 is a diagram illustrating a micro heater according to an exemplary embodiment of the present invention.

FIG. 2 is a diagram illustrating the micro heater according to the exemplary embodiment of the present invention.

As illustrated in FIG. 2, an electrode 124a and an electrode 124b are disposed in a diagonal direction on a base part 140 on both sides of the plurality of antenna element waveguides 122, and one micro heater 126 is connected to each of the electrodes 124a and 124b while crossing over each waveguide 122.

In this case, the micro heater 126 does not cross all the waveguides 122 at once and contacts the base part on each waveguide only once and is connected to the electrode, but contacts the base part on each waveguide 122 once or multiple times and is connected to the electrode. The micro heater 126 has the form in which the micro heater 126 continues in the direction of each waveguide 122 and is bent in the direction in which the waveguide is located (the direction perpendicular to the direction of the waveguide), and is in contact with the base part on the specific waveguide, and then the micro heater 126 is away from the base part on the waveguide again and then continues in the direction of the waveguide again, so that the micro heater 126 may be in contact with the base part on one or a plurality of waveguides at one time. The micro heater 126 may continuously change the position of the base part (on the waveguide) with which the direction is to be in contact, thereby changing the position of the base part on each waveguide and the number of times of the contact. For example, the micro heater 126 illustrated in FIG. 2 is formed to be connected with the electrode 124a, and at first, the micro heater 126 is in contact with only the base part on the waveguide closest to the electrode 124a and then becomes distant, and gradually comes into contact with the base part on the waveguide that is farther away from the electrode 124a and then becomes distant, and finally is connected with the electrode 124b by crossing over all of the waveguides. Since the micro heater 126 is connected with the electrode by changing the number of times of the contact with the base part on each waveguide, even though only one micro heater 126 and two electrodes 124a and 126b are provided, it is possible to heat all of the waveguides at the same time, and it is possible to shift the degree of heating each waveguide. However, FIG. 2 illustrates only the example in which the micro heater 126 is formed in a form in which the numbers of times of the contact with the base part on each waveguide are different, but the present invention is not limited thereto, and the micro heater 126 may have the form in which the numbers of times of the contact with the base part on some waveguides are the same (for example, the form in which the micro heater is connected with another electrode in the form in which the micro heater is first in contact with the base part on the waveguide furthest away from one electrode and then becomes distant, is gradually in contact with the base part on the waveguide that is closer to the one electrode, and then becomes distant, and then is in contact with the base part on the waveguide furthest from the one electrode again and then becomes distant).

The micro heater 122 may be formed by a following process. The micro heater may be manufactured by applying a platinum paste (Pt paste) in a form to be formed by using a micro pen and then irradiating a laser to the applied area.

Referring back to FIG. 1, the micro heater 126 is in contact with the base part on each waveguide and indirectly applies heat to the waveguide 122 to change a refractive index of the waveguide. A cross-section of the waveguide 122 in which the heater 126 is in contact is illustrated in FIG. 3.

Figure 3:
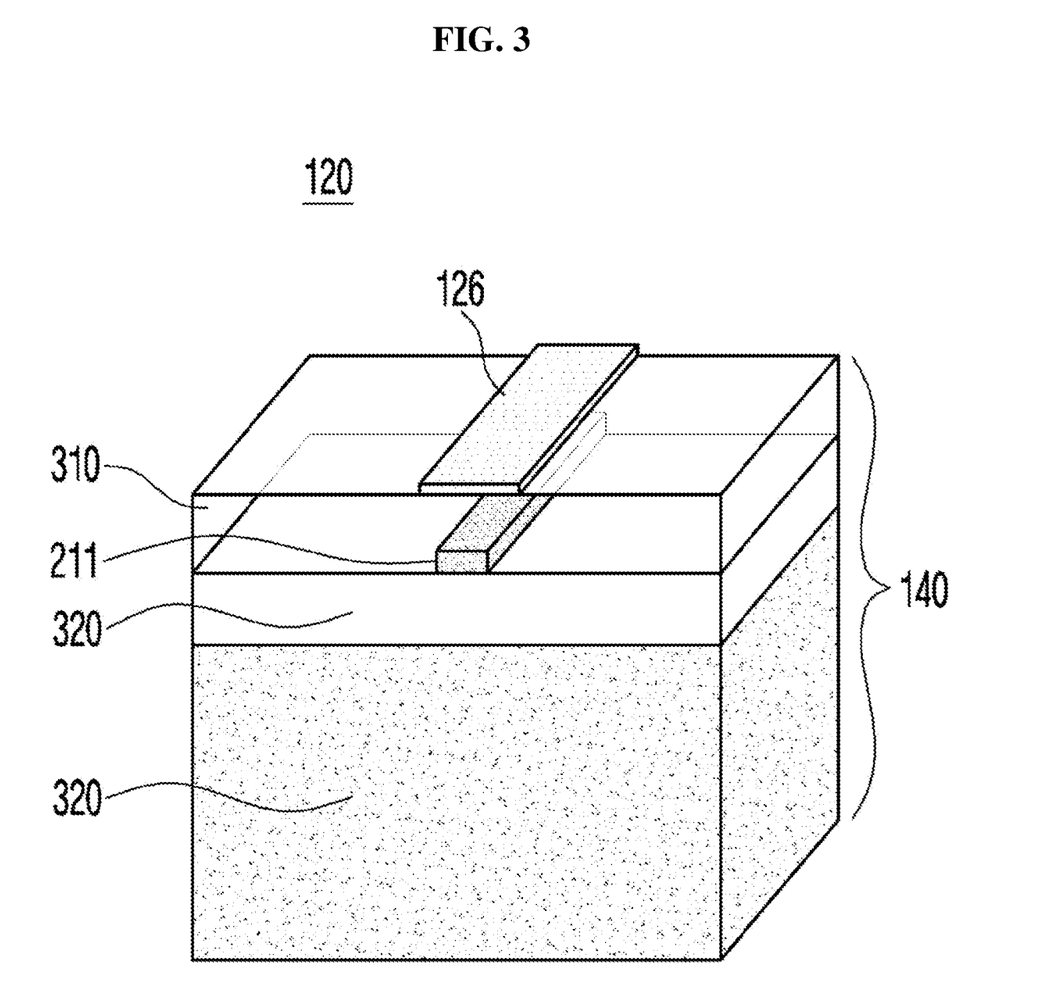
FIG. 3 is a cross-sectional view of a phase shifting unit according to the exemplary embodiment of the present invention.

FIG. 3 is a cross-sectional view of the phase shifting unit according to the exemplary embodiment of the present invention.

Referring to FIG. 3, the base part 140 includes claddings 310 and 320 and a substrate 330. The substrate 330 is implemented with silicon, and is implemented in the form in which the claddings 310 and 320 formed of a silicon oxide ($SiO_2$) are deposited on the substrate 330. In this case, the waveguide 122 is implemented with silicon and is disposed inside the claddings 310 and 320, and the claddings are divided into the upper cladding 310 and the lower cladding 320 based on the waveguide 122. The waveguide 122 has the form of being surrounded by the silicon oxide. Since the waveguide 122 is surrounded by the cladding implemented with the silicon oxide, so that there occurs an effect in reducing optical loss.

In this case, the micro heater 126 is in contact with the upper cladding 310 on the waveguide 122 to transmit heat to the waveguide 122. That is, the micro heater 126 is bent to the base part, that is, the upper cladding 310, on the waveguide in the direction of the waveguide, and is in contact with the upper cladding 310 on the waveguide 122 and transmits the heat to the waveguide 122.

Referring back to FIG. 1, the output unit 130 maintains the phase distribution varied by the phase shifting unit 120, and outputs the light to the upper portion (+z-axis) of the antenna that is the direction vertical to the propagation direction of the light. The output unit 130 may output the light in the z-axis direction on an x-y plane, and the output direction of the light output from the output unit 130 is steered according to the wavelength of the light input to the receiving unit 110 and the phase varied by the phase shifting unit 120.

It is necessary to use an optimized waveguide width in the output unit 130 in order to decrease a distance between the antenna element waveguides 122, and in this case, in order to reduce the size of the evanescent wave, a wide width needs to be used, but the distance between the elements that are close due to the wide width needs to be compensated.

Figure 4:
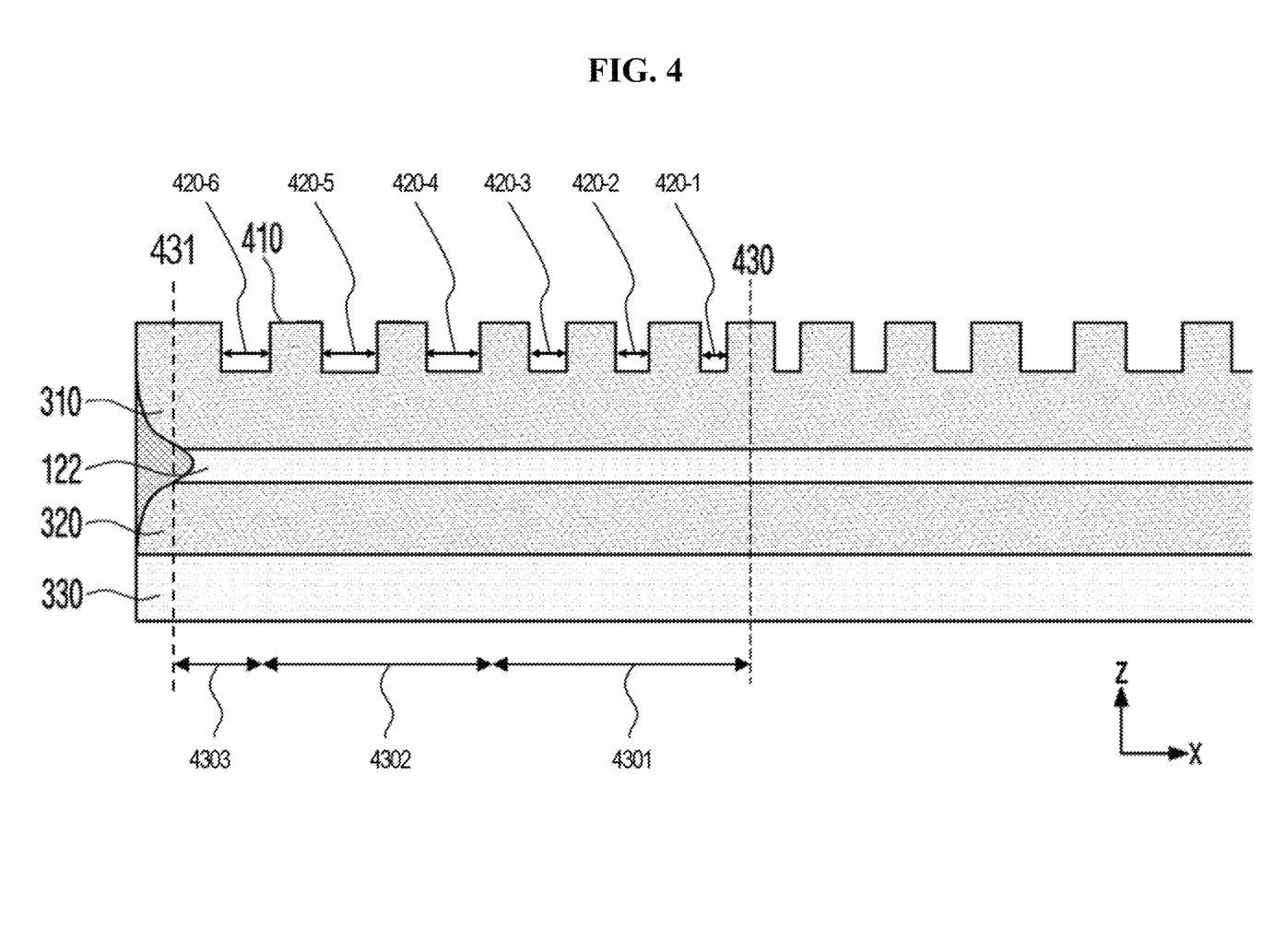
FIGS. 4 and 5 are a cross-sectional view and a perspective view of the antenna element according to the exemplary embodiment of the present invention.
Figure 5:
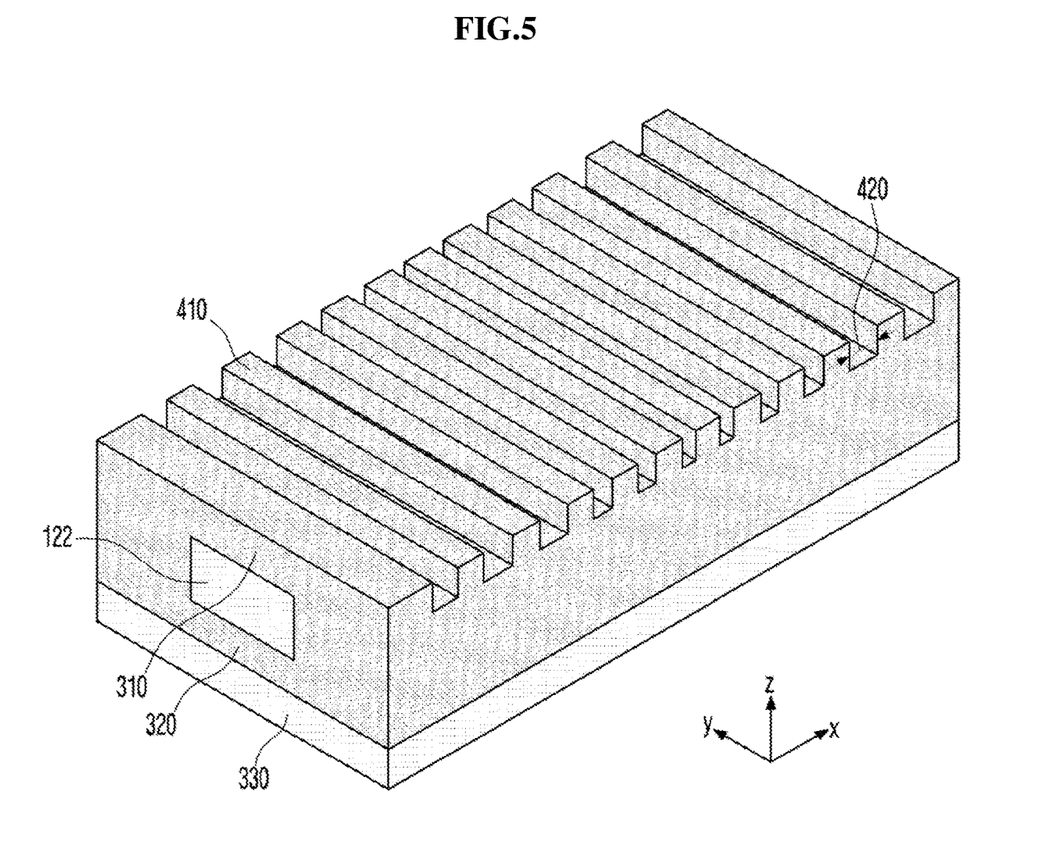

A cross-section of one antenna element 132 within the output unit 130 is illustrated in FIG. 4, and a perspective view of one antenna element 132 is illustrated in FIG. 5.

FIGS. 4 and 5 are a cross-sectional view and a perspective view of the antenna element according to the exemplary embodiment of the present invention.

The antenna element is also the element disposed on the base part 140, so that the antenna element is implemented in the same configuration as that of the cross-section of the phase shifting unit 120. In the antenna element, the claddings 310 and 320 implemented with a silicon oxide ($SiO_2$) are deposited on the silicon substrate 330, and the waveguide 122 is disposed inside the cladding to divide the claddings between the upper cladding 310 and the lower cladding 320. As the waveguide 122 is implemented with silicon and the cladding made of the silicon oxide is positioned on the waveguide 122, the optical loss is significantly reduced. Further, a diffraction grating 410 is formed on the upper portion of the waveguide, and since the diffraction grating has symmetry and aperiodicity, the diffraction grating 410 may be more smoothly formed on a material implemented with a silicon oxide rather than silicon. Accordingly, in the antenna element according to the exemplary embodiment of the present invention, as the cladding and the waveguide are implemented with the above-described material, it is easy to manufacture the antenna element and the optical loss may be reduced.

Since the silicon of the upper cladding 310 has a high refractive index, the upper cladding 310 serves to increase an effective refractive index value of the hybrid waveguide and reduces the mode size, but to minimize nonlinear loss due to 2-photon absorption, the upper cladding 310 has a thickness of 120 nm or less. The maximum value of the silicon thickness that is changed periodically to eliminate the vertical refractive index symmetry may be larger than that of the receiving unit or a modulating unit, and as the material covering the upper portion of the waveguide, a silicon nitride oxide having a larger refractive index than the silicon oxide may be used instead of the silicon oxide depending on the use environment of the LIDAR.

The antenna element includes the diffraction grating 410 in which the thickness of the upper cladding 310 is periodically changed in order for the antenna element to directionally emit light in an upper direction (+z-axis direction). The diffraction grating 410 may be formed by etching, but is not limited thereto, and may be formed by various methods, such as laser etching. In this case, a phase change occurs due to a change in thickness in the thin and thick portions of the diffraction grating 410, and constructive interference is satisfied at the upper portion of the diffraction grating, and destructive interference is satisfied at the lower portion of the diffraction grating. Accordingly, the light propagating to the waveguide 122 in the antenna element is directed upward, and the thickness of the upper and lower silicon oxide claddings 310 and 320 surrounding the waveguide is close to a multiple of half the wavelength to satisfy constructive interference.

In this case, intervals 420 between the diffraction gratings 410 are intentionally formed aperiodically rather than equally spaced. Regardless of the size of the antenna element, in the antenna element, the diffraction grating 410 is formed with symmetry with respect to a center 430 of the antenna element, and the interval 420 between the diffraction gratings is formed aperiodically.

For example, as illustrated in FIG. 4, the interval 420-1, 420-2 or 420-3 between the diffraction gratings of a first area 4301, which is from the center of the antenna element and is extended toward an outer edge 431 of the antenna element, may have the form of increasing toward the outer edge 431 of the antenna element, the interval 420-4 or 420-5 between the diffraction gratings of a second area 4302, which is from an end of the first area and is extended toward the outer edge 431 of the antenna element, may have the form of maintaining constantly, and the interval 420-6 between the diffraction gratings of a third area 4303, which is from an end of the second area and to the outer edge of the antenna element, may have the form of decreasing toward the outer edge. As such, as the interval between the diffraction gratings 410 has aperiodicity and symmetry, the following effects occur. By breaking the periodicity of uniformly arranging the interval between the diffraction gratings 410 and having aperiodicity and symmetry, a large amount of light may be output, so that the vertical light output is increased and the signal strength is increased, and accordingly, the signal strength to noise (S/N ratio) increases at a long distance.

The effect is supported by the graphs illustrated in FIGS. 6A to 6C and 7A to 7C.

FIGS. 6A to 6C and 7A to 7C are graphs illustrating an output of an array antenna in the related art and an output of the optical phase shifting array antenna according to the exemplary embodiment of the present invention.

Figure 6A:
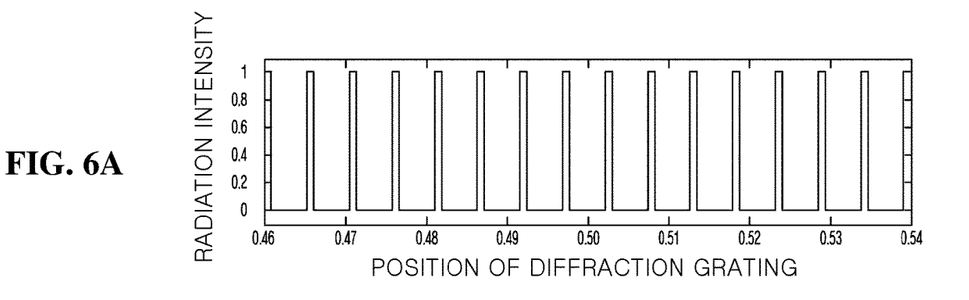
FIGS. 6A to 6C and 7A to 7C are graphs illustrating an output of an array antenna in the related art and an output of the optical phase shifting array antenna according to the exemplary embodiment of the present invention.
Figure 6B:
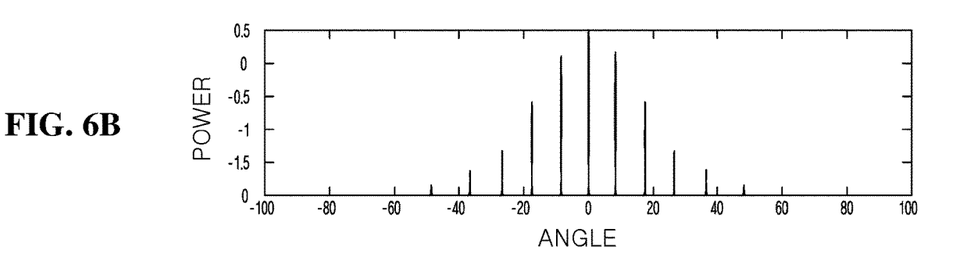
Figure 6C:
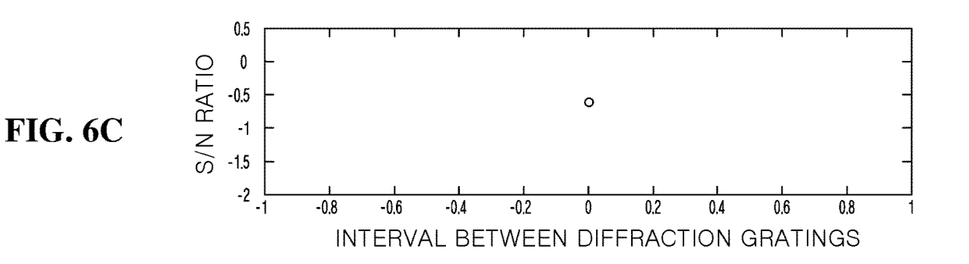

Referring to FIG. 6A, the radiation intensity is formed at equal intervals, so that it can be seen that the positions of the diffraction gratings in the array antenna in the related art are arranged at equal intervals. In this case, referring to FIG. 6B, although a main lobe of constant power is generated at the center (0°), it can be seen that a side lobe of considerable power is generated even at a position deviating from the center. Further, referring to FIG. 6C, since the intervals of the diffraction gratings in the array antenna in the related art are all the same, it can be seen that only the position of 0 has a very low S/N ratio value.

Figure 7A:
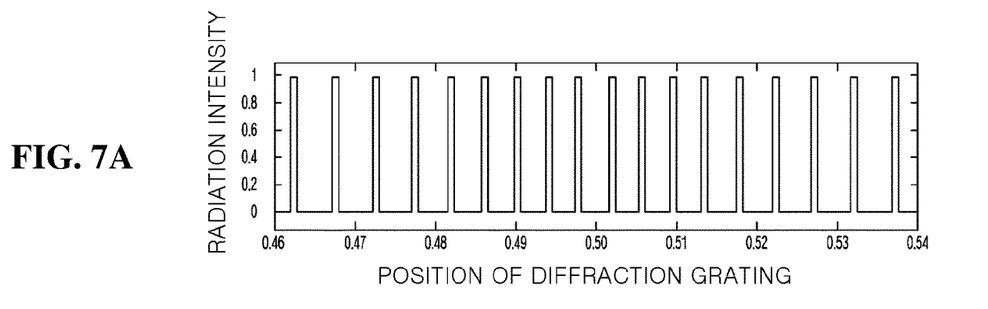
Figure 7B:
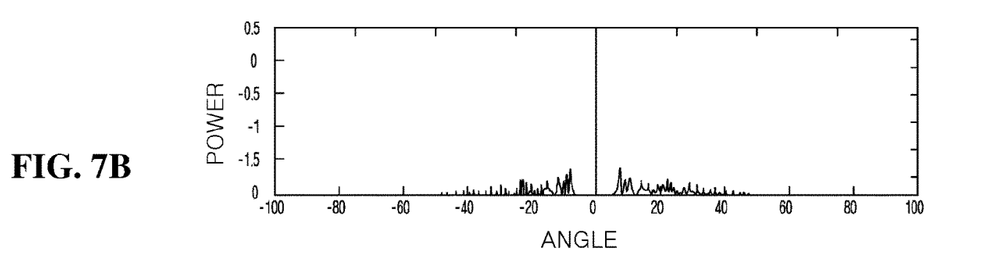
Figure 7C:
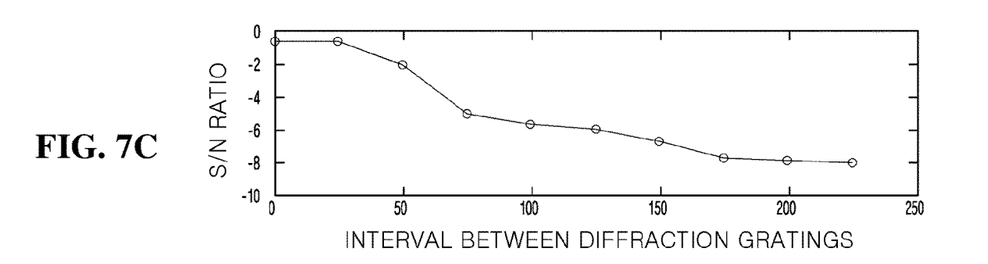

On the other hand, referring to FIG. 7A, it can be seen that the interval between the radiation intensity becomes narrower at the center and the interval becomes wider as the distance from the center increases, so that It can be seen that the position of the diffraction grating in the optical phase shifting array antenna according to the exemplary embodiment of the present invention has aperiodicity and symmetry. In this case, referring to FIG. 7B, a main lobe of constant power is generated at the center (0°), and only a side lobe of significantly reduced power is minutely generated even if slightly deviating from the center (0°), so that it can be seen that the S/N ratio is significantly improved. This is confirmed more clearly with reference to FIG. 7C. It can be seen that the S/N ratio is increasing as the interval between the diffraction gratings is narrower (closer to 0), and the S/N ratio is decreasing as the interval between the diffraction gratings is wide (away from 0). As described above, since the diffraction grating in the optical phase shifting array antenna according to the exemplary embodiment of the present invention has a narrow interval at the center and has a wider interval as it goes away from the center, only the main lobe of constant power and the side lobe of significantly reduced power occur.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. An optical phase shifting array antenna, comprising:
a receiving unit configured to distribute input light to a plurality of antenna element waveguides;
a phase shifting unit configured to shift a phase of light propagated to each antenna element waveguide of the plurality of antenna element waveguides, by applying heat to each antenna element waveguide of the plurality of antenna element waveguides;
an output unit including a plurality of antenna elements, and configured to output the light, which is propagated to each antenna element waveguide of the plurality of antenna element waveguides after a phase is varied in the phase shifting unit, to each antenna element of the plurality of antenna elements; and
a base part configured to seat the receiving unit, the phase shifting unit, and the output unit,
wherein each antenna element of the plurality of antenna elements includes diffraction gratings, which are formed with symmetry with respect to a center of the antenna element, and an interval between the diffraction gratings is formed aperiodically, and
wherein the interval between the diffraction gratings of a first area, which is from the center of the antenna element and is extended toward an outer edge of the antenna element, increases toward the outer edge of the antenna element, the interval between the diffraction gratings of a second area, which is from an end of the first area and is extended toward the outer edge of the antenna element, is maintained constantly, and the interval between the diffraction gratings of a third area, which is from an end of the second area and to the outer edge of the antenna element, decreases toward the outer edge of the antenna element.

2. The optical phase shifting array antenna of claim 1, wherein the receiving unit includes a multi-mode interference coupler, a Y-junction coupler, or a directional coupler in order to distribute the input light to the plurality of antenna element waveguides.

3. The optical phase shifting array antenna of claim 1, wherein in the phase shifting unit, the amounts of heat heating the respective antenna elements waveguide are different from each other.

4. The optical phase shifting array antenna of claim 1, wherein the base part is formed by stacking a silicon substrate and a silicon oxide cladding on the silicon substrate.

5. The optical phase shifting array antenna of claim 1, wherein the output unit outputs the light propagated to the antenna element waveguide in a direction vertical to a propagation direction of light.

* * * * *